United States Patent [19]

Kuriyama et al.

[11] 4,124,088
[45] Nov. 7, 1978

[54] SAFETY DEVICE FOR A VEHICLE

[75] Inventors: Sigeru Kuriyama; Minoru Kaminaga, both of Ibaraki, Japan

[73] Assignee: Hitachi, Ltd., Tokyo, Japan

[21] Appl. No.: 713,813

[22] Filed: Aug. 12, 1976

[30] Foreign Application Priority Data

Sep. 3, 1975 [JP] Japan .................. 50-105953

[51] Int. Cl.² .................. B60K 31/00; B60T 8/08
[52] U.S. Cl. .................. 180/105 E; 180/65 R; 303/106
[58] Field of Search ............ 180/105 R, 65 R, 105 E; 303/96, 106, 109

[56] References Cited

U.S. PATENT DOCUMENTS

| | | | |
|---|---|---|---|
| 2,719,912 | 10/1955 | Maenpaa | 180/105 R |
| 3,630,304 | 12/1971 | Sahinkaya | 180/105 E |
| 3,776,357 | 12/1973 | Arai | 303/109 |
| 4,006,942 | 2/1977 | Saito | 303/106 X |

Primary Examiner—Joseph F. Peters, Jr.
Assistant Examiner—Terrance L. Siemens
Attorney, Agent, or Firm—Beall & Jeffery

[57] ABSTRACT

A velocity at the time when the accelerator of a vehicle is released is stored under a certain condition in advance, and the stored vehicle velocity and an actual vehicle velocity are compared. When the actual vehicle velocity becomes greater than the stored vehicle velocity by a predetermined value, the downward inclination of a running road surface is regarded as exceeding a predetermined value, and safety means such as a brake is driven. As compared with a case of employing an inclination angle sensor such as a mercury switch, the device operates accurately without being influenced by a change in the vibration or acceleration of the vehicle.

2 Claims, 4 Drawing Figures

SAFETY DEVICE FOR A VEHICLE

BACKGROUND OF THE INVENTION

This invention relates to a safety device for a vehicle, and more particularly to a safety device which is suited to automatically apply electric braking in case of running on a downward slope.

Where an electromobile, a battery fork lift or the like travels on a downward slope, the vehicle velocity increases even when an accelerator is kept released. Although the driver or operator of the vehicle actuates braking means with attention on a steep slope, it is often the case on a comparatively gentle slope that the driver or operator does not conduct the braking operation. Even on the gentle slope, however, the vehicle velocity can become great when the traveling is left as it is. If the braking operation is made in a flurry in such case, there will be the danger of causing lateral turning or the like accident.

In one case, there is considered a method in which braking is applied by sensing the inclination angle of the running path. However, there is not any inclination angle sensor suitable for the vehicle. For example, a mercury switch operates erroneously due to the vibration of the vehicle or to an acceleration change at a quick acceleration or deceleration. Any other proposed sensors such as the pendulum type sensor are not suitable for the vehicle, either.

SUMMARY OF THE INVENTION

An object of this invention is to provide a device which is free from the aforementioned disadvantage and which can precisely discriminate the inclining state of a downward slope in a running road when used in a vehicle.

A feature of this invention resides in that a vehicle velocity after the release of an accelerator is stored in advance, and that when the difference between the stored vehicle velocity and an acutal vehicle velocity becomes greater than a predetermined value, the inclination angle of the running road is judged to be greater than a predetermined value and the actuator of safety means, etc. are driven.

Where the vehicle is in the course of deceleration when the accelerator is released, the vehicle velocity to be stored is a vehicle velocity after the deceleration, and where the vehicle is in the course of acceleration, the vehicle velocity to be stored is a vehicle velocity before the acceleration.

DETAILED DESCRIPTION OF THE PREFERRED EMBODIMENTS

Figure 1:
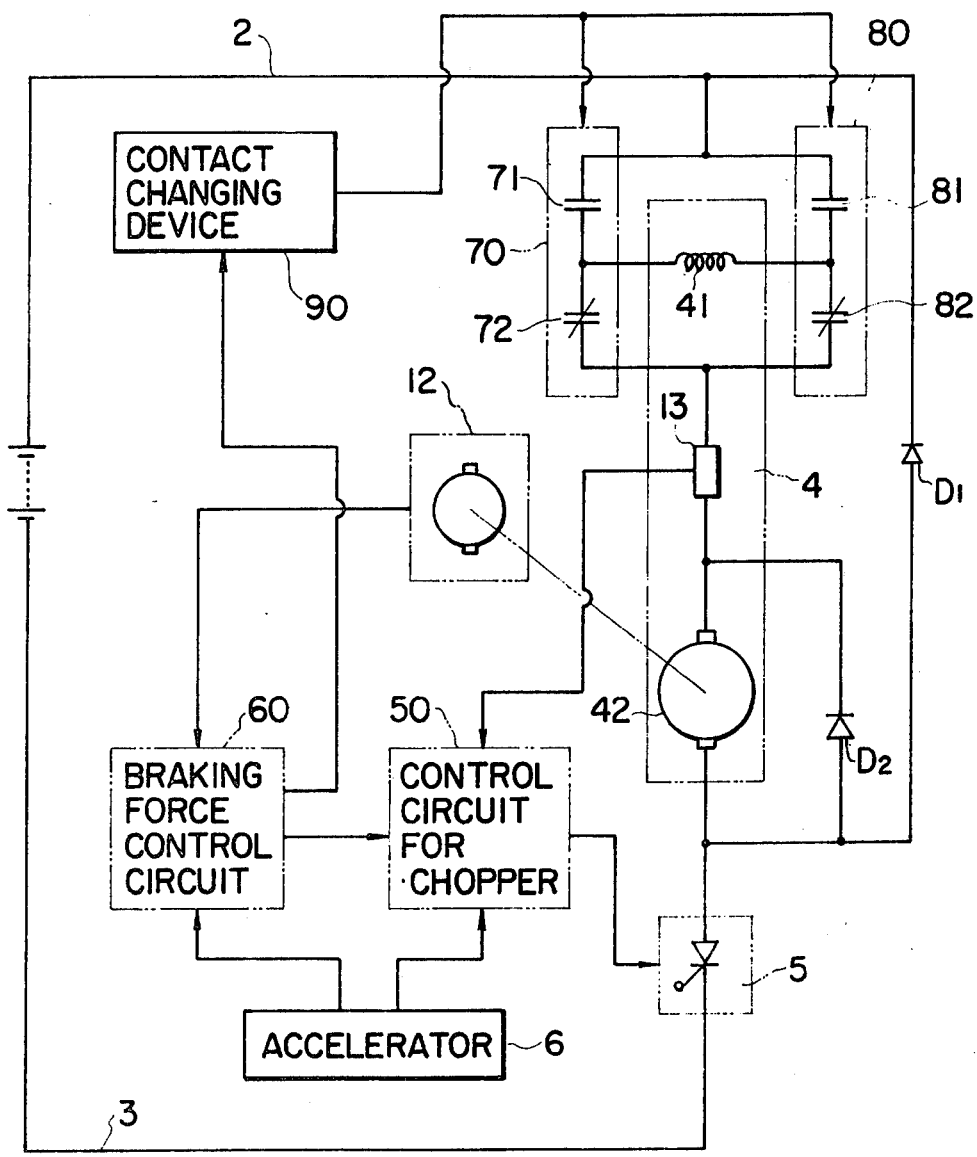
FIG. 1 is a block diagram showing the construction of an electromobile safety device embodying this invention.

Hereunder, embodiments of this invention will be described with reference to the drawing.

In FIG. 1, a contactor for forward running 70 and a contactor for backward running 80 are connected to a (+) power supply lead 2 of a battery 1. A field coil 41 of a motor 4 is connected across intermediate contacts of the respective contactors. A shunt 13 for detecting a current, an armature 42 and a driving device (chopper) 5 are connected in series and are connected to a (−) power supply lead 3. In case of the forward running, a normally-open contact 71 of the forward running contactor 70 is closed and a normally-closed contact 72 is opened, a chopper control circuit 50 is actuated, the conduction state of the chopper 5 is changed, and a current is caused to flow through the motor 4. A diode $D_1$ is the so-called free wheel diode which causes a circulating current to flow through the motor when a thyristor chopper circuit is used as the driving device. The chopper control circuit 50 effects the control of changing the conduction state of the chopper 5 by an instruction of an accelerator 6 and the current value detected by the shunt 13. By way of example, a monostable multivibrator is employed as the control circuit 50, and it controls the current conduction rate of the chopper circuit.

When the velocity of the vehicle increases in spite of the fact that the contactor is not operated, a braking force control circuit 60 is actuated by a signal of a vehicle velocity detector 12 which generates a voltage proportional to a rotational frequency of the motor 4. The backward running contactor 80 is turned "on" (a normally-open contact 81 is closed and a normally-closed contact 82 is opened) through a contactor changing device 90 so as to reverse the motor 4, and the chopper 5 is operated. That is, the plugging (reversal braking) is carried out, and the control is so made as to reduce the vehicle velocity to a safe one.

Figure 2:
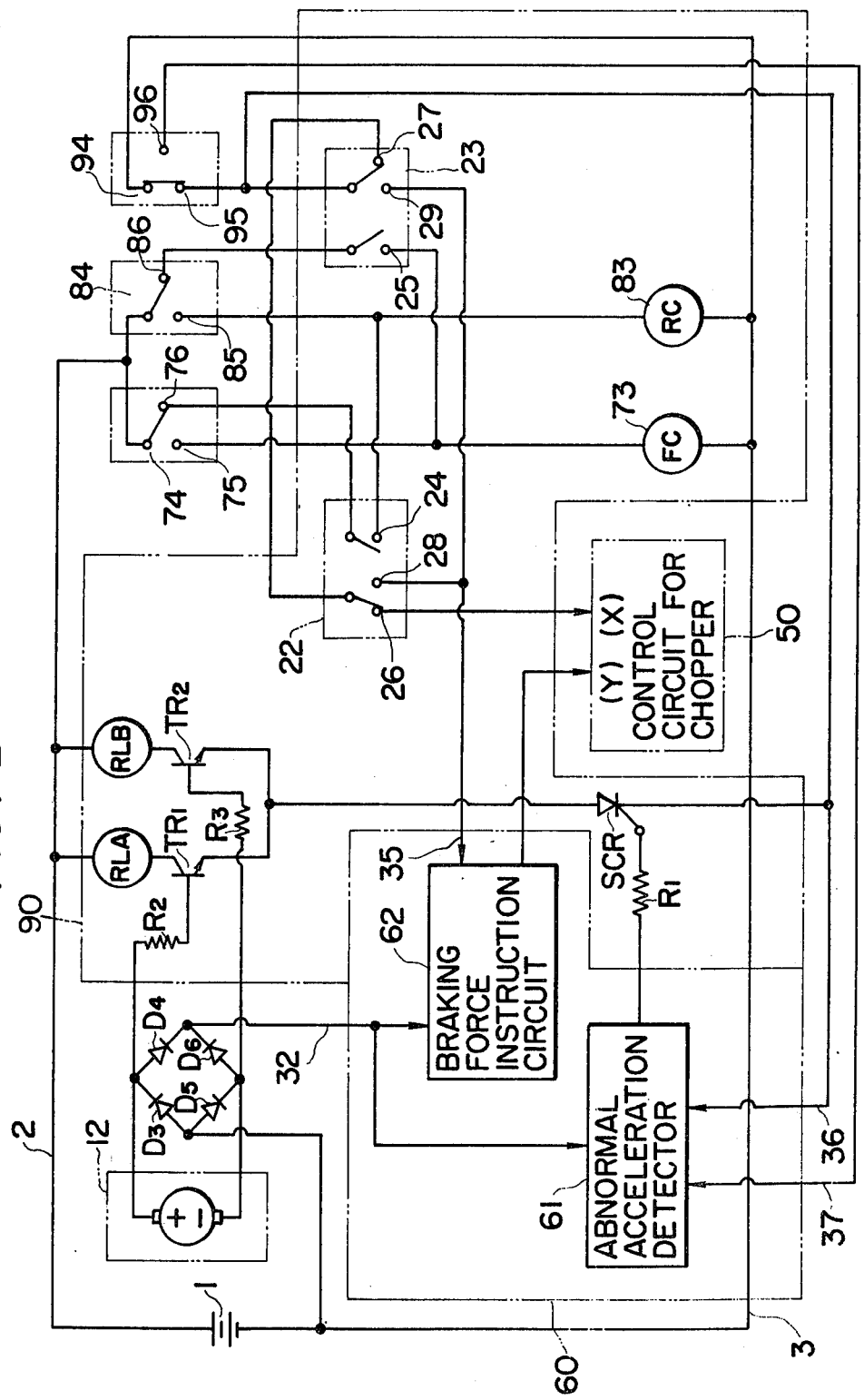
FIG. 2 is a detailed diagram of a control portion in FIG. 1.
Figure 3:
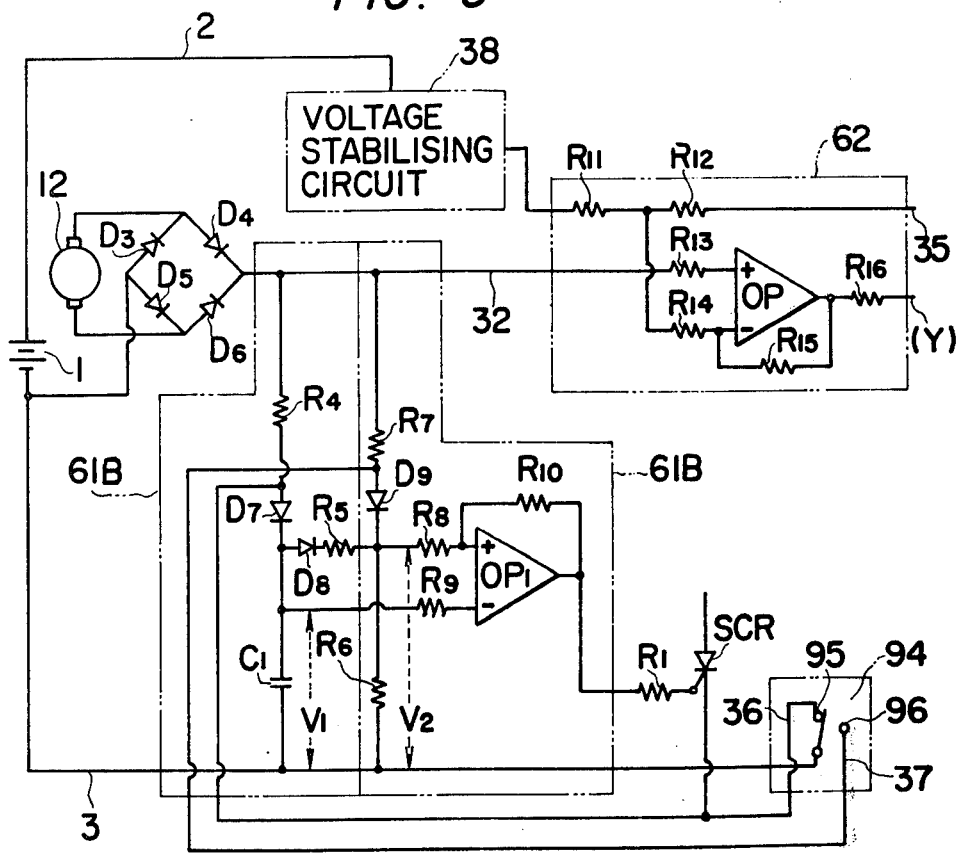
FIG. 3 is a detailed diagram of a vehicle velocity storage and comparator circuit and a braking force adjusting circuit in FIG. 2.

Referring to FIGS. 2 and 3, the braking force control circuit 60 and the contactor changing device 90 will be described in detail.

A normally-open contact 75 of a forward running switch 74 which is operated by a driver's manipulation, and an exciting coil 73 for the forward running contactor are connected between the (+) power supply lead 2 and the (−) power supply lead 3. Likewise, a backward running switch 84 and an exciting coil 83 for the backward running contactor are connected between the power supply leads 2 and 3. A contact 24 of a first relay 22 is connected to a contact 85 of the backward running switch 84, while a contact 25 of a second relay 23 is connected to a contact 74 of the forward running switch 74.

A normally-closed contact 95 of a neutral switch 94 for detecting the release of the accelerator is connected through a contact 27 of the second relay 23 as well as a contact 26 of the first relay 22 to an operation stopping terminal (X) of the chopper control circuit 50. Thus, when a potential at the terminal (X) becomes the (−) power supply potential, the operation of the chopper 5 for the motor is stopped. When contacts 28 and 29 of the first relay 22 and the second relay 23 are closed, a potential at a relay operation detecting lead 35 lowers.

A bridge composed of diodes $D_3$–$D_6$ is connected to output terminals of the vehicle velocity detector 12 which is constructed of a d.c. generator (for example, a d.c. machine having permanent magnets). Thus, the voltage proportional to the rotational frequency of the motor 4 is led to a velocity-proportional voltage line 32 independently of the rotational direction of the motor.

The braking force control circuit 60 is made up of an abnormal acceleration detector 61 and a braking force instruction circuit 62. The abnormal acceleration detector 61 receives as inputs the signal of the velocity-proportional voltage line 32, a signal of a neutral position detecting lead 36 for detecting the release of the accelerator 6 owing to the neutral switch 94 and a signal of a powering detecting lead 37 for detecting the manipulation of the accelerator 6. When the vehicle velocity increases in spite of the fact that the accelerator is released, a trigger pulse is impressed on the gate of a thyristor SCR of the contactor changing device 90 through a resistance $R_1$, so that the thyristor SCR is rendered conductive.

Now, description will be made of the contactor changing device 90. Assume that the polarities of the voltage generated by the vehicle velocity detector 12 when the vehicle is in the forward running direction are as indicated in FIG. 2. Then, the (+) pole is connected through a resistance $R_2$ to the base of a transistor $TR_1$, and the (−) pole is connected through a resistance $R_3$ to the base of a transistor $TR_2$. The emitters of the transistors $TR_1$ and $TR_2$ are connected in common, and are connected to the anode of the thyristor SCR. The collector of the transistor $TR_1$ is connected to one end of an excitation coil RLA of the first relay 22. The other end of the excitation coil RLA is connected to the (+) power supply lead 2. Similarly, the collector of the transistor $TR_2$ is connected to an excitation coil RLB of the second relay 23.

The braking force instruction circuit 62 receives as inputs the signal of the relay operation detecting lead 35 and the signal of the velocity-proportional voltage lead 32. It adjusts the braking force so as to make the vehicle velocity substantially constant. An output of the instruction circuit 62 is connected to a terminal (Y) of the chopper control circuit 50. As shown in FIG. 3, the arrangement of the braking force instruction circuit 62 consists of resistances $R_{11}$–$R_{16}$ and an operational amplifier $OP_2$.

In the above circuit, under the state under which the accelerator is released, the forward running switch 74, the backward running switch 84 and the neutral switch 94 close the contacts as shown in FIG. 2. Now, where the vehicle increases the velocity in the forward running direction, the abnormal acceleration detector 61 is actuated to conduct the thyristor SCR. Since the polarities of the vehicle velocity detector 12 in the forward running direction are as indicated in FIG. 2, the transistor $TR_1$ is rendered conductive and the first relay 22 is energized. In consequence, the contact 24 is closed, a current flows through the excitation coil 83 for the backward running contactor, and the backward running contactor 80 is turned "on." On the other hand, the contact 26 is opened, so that the potential of the operation stopping terminal (X) is enhanced and that the chopper control circuit 50 is actuated. Subsequently, the contact 28 is closed, so that the potential of the relay operation detecting lead 35 is lowered and that the braking force instruction circuit 62 is actuated. An instruction signal is applied to the instruction signal terminal (Y) so as to adjust the braking force to render the vehicle velocity constant.

The abnormal acceleration detector 61 will now be described in detail.

The abnormal acceleration detector 61 is composed of a memory circuit 61A and a comparator circuit 61B.

A resistor $R_4$, diodes $D_7$ and $D_8$ and resistors $R_5$ and $R_6$ are connected in series, and are incorporated between the velocity-proportional voltage lead 32 and the (−) power supply lead 3. One end of each of a capacitor $C_1$ and a resistor $R_9$ is connected to the juncture between the diodes $D_7$ and $D_8$, while the other ends of the respective elements are connected to the (−) power supply lead 3 and an inversion input terminal of an operational amplifier $OP_1$. A resistance $R_7$, a diode $D_9$ and a resistance $R_8$ are connected in series, and are incorporated between the velocity-proportional voltage lead 32 and a non-inversion input terminal of the operational amplifier $OP_1$. The juncture between the diode $D_9$ and the resistance $R_8$ and that between the resistances $R_5$ and $R_6$ are connected with each other. The neutral position detecting lead 36 is connected to the juncture between the resistance $R_4$ and the diode $D_7$. The juncture between the resistance $R_7$ and the diode $D_9$ is connected to the powering detecting lead 37. Shown at 38 is a voltage stabilizing circuit. A resistance $R_{10}$ is connected between the non-inversion input terminal and an output terminal of the operational amplifier $OP_1$. The output terminal is connected through the resistance $R_1$ to the gate of the thyristor SCR.

Letting $V_S$ denote the voltage of the velocity-proportional voltage lead 32 under the powering state of the vehicle (under which the neutral switch 94 is thrown onto the side of the normally-open contact 96), and $V_D$ denote the forward voltage drop of the diode, $V_1$ (in FIG. 3) is as follows:

$$V_1 = \frac{(V_S - 2 V_D)(R_5 + R_6)}{R_4 + R_5 + R_6} + V_D \qquad (1)$$

The voltage $V_1$ is charged in the capacitor $C_1$. $V_2$ (in FIG. 3) becomes as follows:

$$V_2 = \frac{(V_S - 2 V_D) R_6}{R_4 + R_5 + R_6} \qquad (2)$$

The voltage $V_1$ is greater than the voltage $V_2$, and the output of the operational amplifier $OP_1$ is closed to zero V.

Subsequently, when the accelerator is released, the neutral switch 94 falls into the state shown in FIG. 2. The charging circuit of the capacitor $C_1$ is not established. The voltage $V_2$ becomes as follows:

$$V_2 = \frac{(V_S - V_D) R_6}{R_6 + R_7} \qquad (3)$$

Usually, the resistance values $R_4$ and $R_7$ are made identical. Therefore, the voltage having been charged in the capacitor $C_1$ is greater than the voltage indicated by Eq. (3). In consequence, the voltage of the capacitor $C_1$ is discharged through the diode $D_8$ and the resistance $R_5$. The voltage $V_1$ becomes:

$$V_1 = V_2 + V_D \qquad (4)$$

Figure 4:
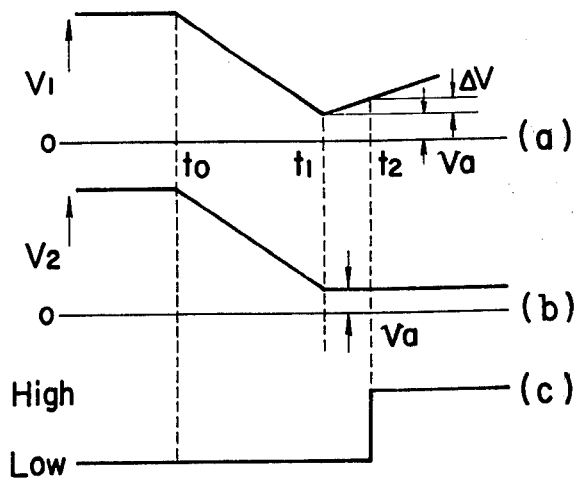
FIG. 4 is a diagram for elucidating the operation of the circuitry in FIG. 3.

However, if the vehicle velocity increases and the charged voltage is greater than the voltage $V_2$, the capacitor $C_1$ will not have the voltage discharged and will hold the voltage value. That is, the voltage $V_1$ is held as it is, and the voltage $V_2$ is increased. Therefore, the operational amplifier $OP_1$ is rendered operative to ignite the thyristor SCR. This operation is illustrated in FIG. 4. As indicated at (a) and (b), both the voltage $V_1$ corresponding to the actual velocity of the vehicle and the voltage $V_2$ corresponding to the stored vehicle velocity lower gradually from a time $t_0$ at which the accelerator is returned to the neutral position, to a time $t_1$ at which the vehicle velocity decreases. When the vehicle velocity increases from the time $t_1$, the voltage $V_1$ increases but the voltage $V_2$ holds its voltage value. For this reason, the output of the operational amplifier $OP_1$ changes from a low level to a high level at a time $t_2$ as shown at (c). The thyristor SCR is triggered by the output.

In order to check the charging of the capacitor $C_1$ when the accelerator is returned, the powering detecting lead 37 is used. However, the same effect can be attained with the combination between the neutral position detecting lead 36 and a transistor.

According to this invention, the vehicle velocity before its increase is stored, and the detector circuit operates when the actual vehicle velocity increases over the stored vehicle velocity by a certain value. Therefore, malfunctions are less than in case of employing the inclination angle sensor, and even a very small acceleration can be reliably detected.

This invention is also applicable to a safety device of a car carrying an engine with which the engine braking is difficult to apply, for example, an automobile equipped with a torque converter.

We claim:

1. In an electromobile comprising a motor as a driving source, an accelerator for issuing a velocity instruction signal, means to control said motor in response to said instruction signal, means to detect a vehicle velocity, and means to apply electric braking by utilizing said motor, a safety device for said electromobile characterized by comprising: means to store a vehicle velocity, the storing means being so constructed as to store the vehicle velocity at the time when said accelerator issues an instruction of zero velocity, to renew and store the vehicle velocity each time under the state under which said vehicle velocity lowers, and to hold and store a vehicle velocity value before increase of said vehicle velocity when the vehicle velocity increases; comparison means to compare the stored vehicle velocity and the detected vehicle velocity and to provide an output when said detected vehicle velocity becomes greater than said stored vehicle velocity by a predetermined value; and a control device which drives, by said output of said comparison means, said means to apply electric braking.

2. The safety device for an electromobile according to claim 1, characterized in that said control device has electric braking force instruction means for automatically adjusting a braking force in dependence on the magnitude of said vehicle velocity.

* * * * *